Feb. 10, 1931.  R. DOS SANTOS  1,792,190
RICE AND GRAIN WASHING UTENSIL
Filed July 24, 1929  2 Sheets-Sheet 1
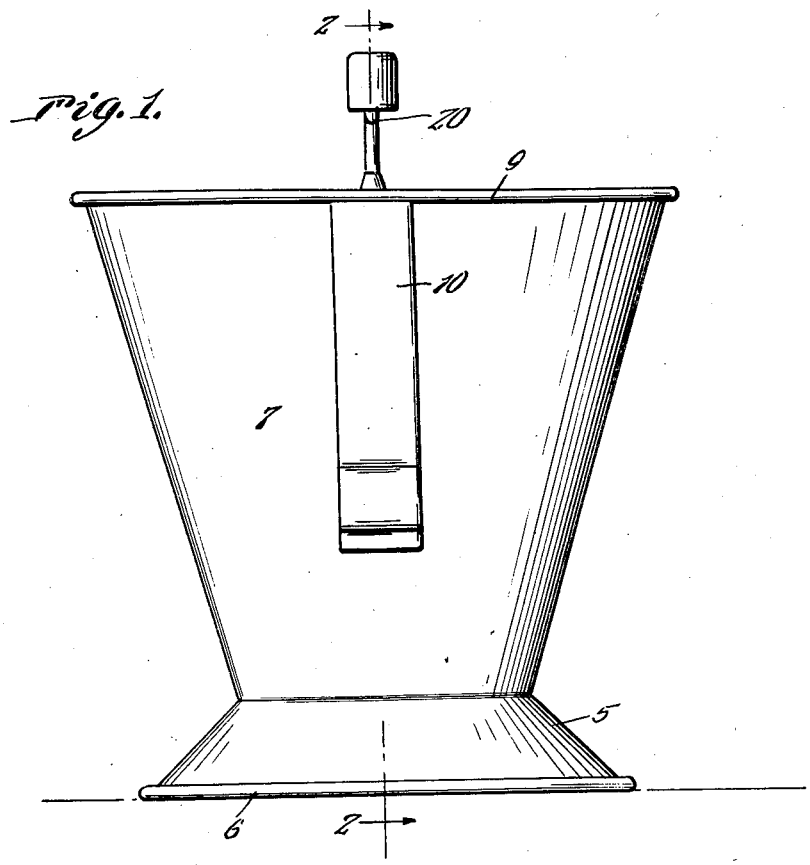
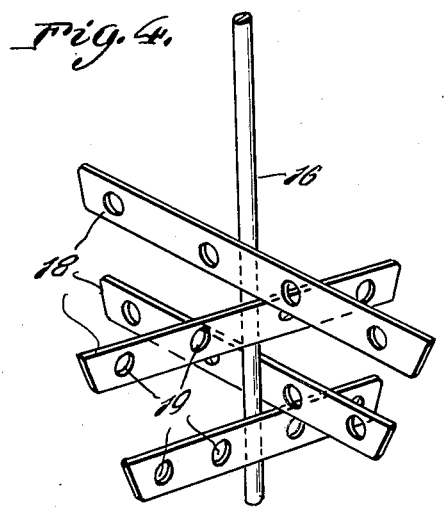
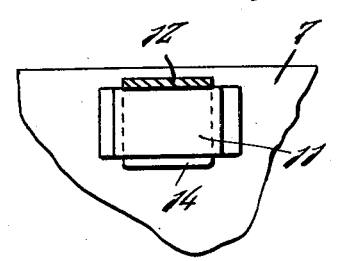
Inventor
Roal dos Santos
By *Clarence A. O'Brien*
Attorney Feb. 10, 1931.  R. DOS SANTOS  1,792,190
RICE AND GRAIN WASHING UTENSIL
Filed July 24, 1929   2 Sheets-Sheet 2
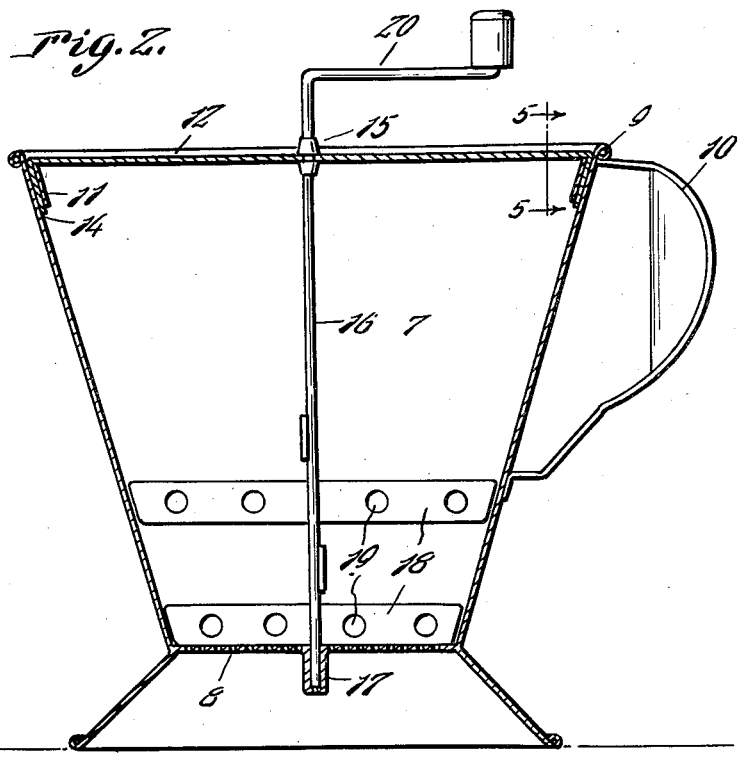
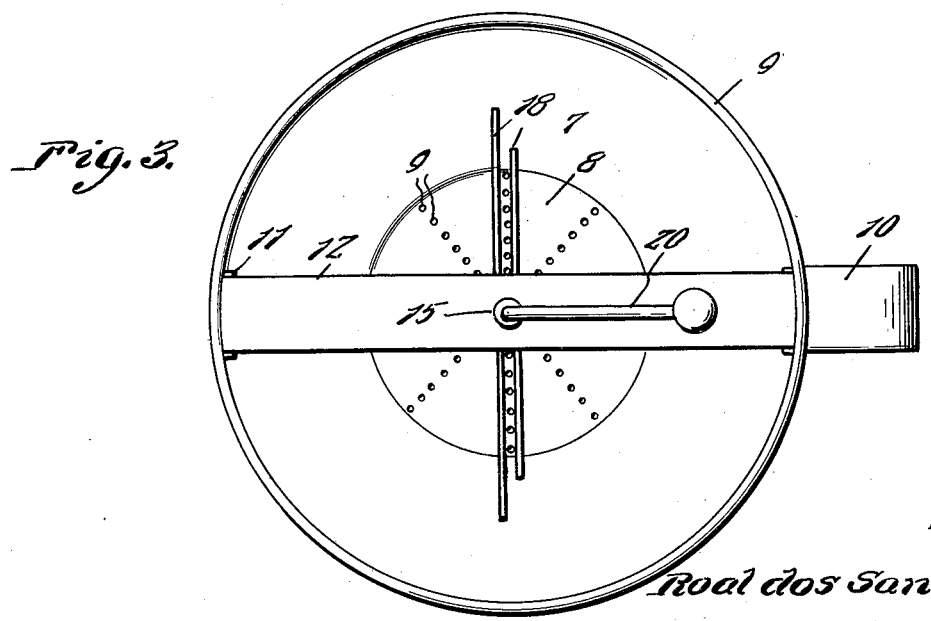
Inventor
Roal dos Santos Patented Feb. 10, 1931

1,792,190

UNITED STATES PATENT OFFICE

ROAL DOS SANTOS, OF HONOLULU, TERRITORY OF HAWAII

RICE AND GRAIN WASHING UTENSIL

Application filed July 24, 1929. Serial No. 380,702.

The present invention relates to a utensil for washing rice, grain, and the like and has for its prime object to provide a structure which is simple, inexpensive to manufacture, strong and durable, easy to assemble and disassemble, compact and convenient, easy to operate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the utensil embodying the features of my invention, Figure 2 is a vertical section therethrough taken substantially on the line 2—2 of Figure 1, Figure 3 is a top plan view thereof, Figure 4 is a perspective view of the agitator, and Figure 5 is an enlarged detail section taken substantially on the line 5—5 of Figure 2.

Referring to the drawing in detail it will be seen that the numeral 5 denotes a frusto-conical skirt base section having at its lower edge a bead 6 and merging at its upper edge into an inverted frusto-conical body 7 which is separated from the skirt base 5 by a bottom 8 which is perforated as at 9 to form a sieve. The upper edge of the body 7 is rolled to form a bead 9. A suitable handle 10 is mounted on one side of the body 7. A pair of oppositely disposed keepers 11 are mounted in the upper end of the body 7. A bar 12 is formed with depending ends 14 receivable in the keepers 11 so as to extend diametrically across the upper end of the body.

This bar 12 has a bearing 15 formed therein. An agitator comprises a vertical shaft 16 having its upper portion journaled in the bearing 15 and its lower end journaled in a depending pocket bearing 17 formed in the center of the sieve body 8.

Two pairs of paddles 18 are fixed across the bottom portion of the shaft 16 and are perforated as at 19. One pair of paddles is disposed at right angles to the other pair. The lowermost paddle 18 has its bottom edge flush with the sieve bottom 8 and prevents the perforations 9 from becoming clogged when the agitator is in operation.

In using this utensil the agitator mechanism is removed along with the bar 12 and the rice or grain is placed in the container formed by the body 7 and the sieve body 8. The utensil is placed under a faucet or other source of water so that the water may run on the rice or grain and simultaneously the handle 20 formed at the upper end of the shaft 16 is rotated and oscillated thus agitating the rice and thoroughly cleansing the same as the water runs through the utensil.

The purpose of this utensil is for washing the rice but it can be used for numerous other similar purposes. This utensil will clean the rice, grain or the like and allow the water to drain therefrom with the dirt and it is not necessary that the human hand touch the contents of the water at all.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A utensil of the character described comprising a frusto-conical base, an inverted frusto-conical container formed integrally on the base having a perforated button at its point of mergence with the base constituting a sieve, a bearing formed centrally in the bottom and depending therefrom into the base, a pair of brackets mounted on the interior of the container in the upper end portion thereof and on diametrically opposite sides, a bar extending across the upper end portion of the container having downturned opposite end portions slidably insertable in the brackets in a manner to detachably mount the bar in position in the container, a bearing extending through the bar in vertical alignment with the first named bearing, a vertical shaft journaled for rotation in the bearings, an operating crank on the upper end of the shaft, and pairs of perforated agitators fixed on the lower portion of the shaft within the container.

In testimony whereof I affix my signature.

ROAL DOS SANTOS.